3,420,787
POLYURETHANE FOAMS DERIVED FROM
HYDROXYALKYLATED UREAS
Harold E. Reymore, Jr., Wallingford, and James N. Tilley,
Cheshire, Conn., assignors to The Upjohn Company,
Kalamazoo, Mich., a corporation of Delaware
No Drawing. Filed Mar. 25, 1966, Ser. No. 537,287
U.S. Cl. 260—2.5                                 5 Claims
Int. Cl. C08g 22/44; C08g 41/00; C09k 3/28

ABSTRACT OF THE DISCLOSURE

Polyurethane foams are rendered fire retardant by the use, as part or the whole of the polyol component, of a combination of a phosphorus containing polyol and an hydroxy alkylated urea having the formula:

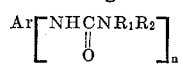

wherein Ar represents an aromatic hydrocarbon residue of valency $n$ containing from 0 to 4 halo substituents, $R_1$ and $R_2$=lower-alkyl and $n$=1 to 3. The phosphorus containing polyols are N,N-di(hydroxyalkyl)aminomethane phosphonates, propylene oxide adducts of phosphoric acid and tris propylene glycol phosphates. Use of the urea in combination with the phosphorus polyol enables the structural strength of the foam to be increased without decrease in fire retardancy.

---

This invention relates to novel polyurethanes and to methods for their preparation and is more particularly concerned with both cellular and non-cellular polyurethanes which have incorporated therein certain 1-aryl-3,3-di(hydroxyalkyl) ureas, and with methods of preparing said polyurethanes.

This invention, in its broadest aspect, comprises a process for producing fire-retardant polyurethanes by the incorporation into the polyurethane producing reaction mixture of a substituted urea having the formula

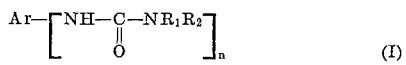
(I)

wherein Ar represents an aromatic hydrocarbon residue having a valency $n$ which is substituted by from 0 to 4 halogen atoms, $R_1$ and $R_2$ each represent lower-hydroxyalkyl and $n$ is an integer from 1 to 3, inclusive.

The term "aromatic hydrocarbon residue having a valency $n$" means a mono or polycyclic aromatic hydrocarbon from which $n$ (i.e. from 1 to 3) hydrogen atoms attached to nuclear carbon atoms have been removed. Examples of aromatic hydrocarbons from which said residues are derived are benzene, naphthalene, anthracene, biphenyl, diphenylmethane, triphenylmethane, benzyldiphenylmethane and mono- and poly- alkyl derivatives thereof, and the like. The term "halogen" is inclusive of chlorine, bromine, fluorine, and iodine. The term "lower-hydroxyalkyl" means alkyl from 1 to 8 carbon atoms inclusive, substituted by hydroxy. Examples of lower-hydroxyalkyl are methylol, 2 - hydroxyethyl, 2 - hydroxypropyl, 3-hydroxypropyl, 4-hdyroxyhexyl, 2-methyl-3-hydroxyhexyl, 4-hydroxyoctyl, and the like.

Where the aromatic residue Ar is polycyclic and $n$ is 2 or 3, the substituents (NHCONR$_1$NR$_2$ and halogen if present) are attached to nuclear carbon atoms in the same or different rings and, when in the same ring, can be disposed in the ortho, meta and/or para positions with respect to each other.

The term "fire retardant polyurethanes" employed herein is one well recognized and widely used in the art. It is generally understood to mean, and will be used herein as meaning, a polyurethane which, in the case of foam and sheeting shows a rating of at least "self-extinguishing" in the ASTM D–1692–59T procedure, and which, in the case of a film or coating of 0.05 in. or less in thickness shows a rating of at least "self-extinguishing" in the ASTM D–568–56T procedure.

It is an object of this invention to provide a method of imparting fire retardant properties to polyurethanes or, alternatively, of enhancng the inherent fire retardant properties of polyurethanes. It is a further object of the invention to provide novel polyurethanes prepared from polyols having the Formula I above. It is yet a further object of the invention to provide polyol mixtures which are stable on storage in admixture with catalysts, foaming agents and like additives normally employed in the formation of polyurethanes.

These objects are achieved by replacing a portion of the polyol conventionally employed in producing polyurethane by a compound having the Formula I above or by mixtures of two or more compounds having the Formula I above. Advantageously the amount of the compound having the Formula I, or mixtures of such compounds, which is employed according to the process of the invention is from about 5% to about 90%, based on hydroxyl equivalent, of the total polyols used in making the polyurethane.

In the preparation of polyurethanes according to the invention conventional procedures are employed, the novel feature of the invention residing in the replacement of a portion, within the ranges defined above, of the conventional polyol by a compound of the Formula I above or by a mixture of such compounds. While the use of the compounds (I) can be applied to the formation of any type of polyurethane including cellular and non-cellular polyurethanes, it is of particular application in the preparation of cellular polyurethane products. Accordingly the process of the invention will be illustrated by reference to the preparation of cellular products but it is to be understood that the invention is not limited thereto but is of general application to the preparation of polyurethanes of all types.

The various methods for the preparation of polyurethane foams are well known in the art and do not require detailed discussion; see, for example, Dombrow, "Polyurethanes," Reinhold Publishing Corp., New York, pp. 1–105 (1957); Saunders et al., "Polyurethanes," Part I, Interscience Publishers, New York (1962).

One of the commonest procedures consists in reacting a polyol, for example, a polyester or polyether, with an organic polyisocyanate and with water, if necessary in the presence of catalysts, surface active agents or other auxiliary agents, whereby simultaneous interaction between the isocyanate, water and the polyol occurs to give the required foam product. This is the so-called "one-shot" procedure. Alternatively the polyol may be reacted with sufficient polyisocyanate to give an intermediate reaction product containing free isocyanate groups and this product, known as prepolymer, may then be reacted with water, if desired in the presence of catalyst, surface active agents or other auxiliary agents, in order to produce the final foamed product. This latter is the so-called "prepolymer" process. Many variations in the method of carrying out these basic processes are known.

Any of the prior art polyisocyanates conventionally used in the preparation of rigid polyurethane foams can be employed in the process of the present invention. Illustrative of such isocyanates are 2,4-tolylene diisocyanate, 2,6-tolylene diisocyanate, 4,4'-diphenylmethane diisocyanate, dianisidine diisocyanate, tolidine diisocyanate, hexamethylene diisocyanate, m-xylylene diisocyanate, 1,5-naphthalene diisocyanate, and other di- and higher polyisocyanates such as those listed in the tables of Siefken, Ann. 562, 122–135 (1949). Mixtures of two or more of the above isocyanates can be used if desired. Preferred polyisocyanates are products obtained by phosgenation of mixtures of methylene-bridged polyphenyl polyamines obtained by the interaction of formaldehyde, hydrochloric acid, and primary aromatic amines, for example, aniline, o-chloroaniline, o-toluidine, or mixtures thereof. Such polyisocyanates are known in the art, e.g., U.S. 2,683,730, 2,950,263, and 3,012,008, Canada Patent No. 665,495, and German Patent 1,131,877. A particularly preferred polyisocyanate of this type is the polymethylene polyphenyl isocyanate available commercially under the trademark PAPI®.

Similarly any of the prior art polyols conventionally employed in the preparation of foams, can be employed in the process of the invention. The polyols conventionally employed in the preparation of polyurethane foams have a hydroxyl number within the range of approximately 180 to approximately 800. The polyols normally used for the preparation of rigid foams are those having a hydroxyl number in the range of approximately 300 to approximately 800.

Illustrative polyols which can be used in the process of the invention are polyethers such as polyoxyalkylene glycols such as the polyoxyethylene glycols prepared by the addition of ethylene oxide to water, ethylene glycol or diethylene glycol; polyoxypropylene glycols prepared by the addition of 1,2-propylene oxide to water, propylene glycol or dipropylene glycol; mixed oxyethyleneoxypropylene polyglycols prepared in a similar manner utilizing a mixture of ethylene oxide and propylene oxide or a sequential addition of ethylene oxide and 1,2-propylene oxide; polyether glycols prepared by reacting ethylene oxide, propylene oxide or mixtures thereof with mono- and polynuclear dihydroxy benzenes, e.g., catechol, resorcinol, hydroquinone, orcinol, 2,2-bis(p-hydroxyphenyl)propane, bis(p-hydroxyphenyl) methane, and the like; polyethers prepared by reacting ethylene oxide, propylene oxide, or mixtures thereof with aliphatic polyols such as glycerol, sorbitol, trimethylolpropane, 1,2,6-hexanetriol, pentaerythritol, sucrose or glycosides, e.g., methyl, ethyl, propyl, butyl, and 2-ethylhexyl, arabinoside, xyloside, fructoside, glucoside, rhamnoside, etc.; polyethers prepared by reacting ethylene oxide, propylene oxide or mixtures thereof with alicyclic polyols such as tetramethylolcyclohexanol; polyols containing a heterocyclic nucleus such as 3,3,5-tris(hydroxymethyl)-5-methyl-4-hydroxytetrahydropyran and 3,3,5,5-tetrakis(hydroxymethyl)-4-hydroxytetrahydropyran; or polyols containing an aromatic nucleus such as 2,2-bis-(hydroxyphenyl)ethanol, pyrogallol, phloroglucinol, tris(hydroxyphenyl)alkanes, e.g., 1,1,3-tris(hydroxyphenyl)ethanes, and 1,1,3-tris(hydroxyphenyl)propanes, etc., tetrakis(hydroxyphenyl)alkanes, e.g., 1,1,3,3 - tetrakis(hydroxy - 3 - methylphenyl)propanes, 1,1,4,4-tetrakis(hydroxyphenyl)butanes, and the like.

A particularly useful polyol for employment in the process of the invention is a polyol mixture comprising a polyol adduct produced by mixing under hydroxyalkylation conditions from 2 to 20 molecular equivalents of ethylene oxide, propylene oxide, or 1,2-butylene oxide, or mixtures thereof, and one amine equivalent of a polyamine mixture, 100 parts of said polyamine mixture containing from 35 to 90 parts of methylene dianilines, the remaining parts being triamines and polyamines of higher molecular weight, said methylenedianilines, triamines, and polyamines of higher molecular weight having been formed by acid condensation of aniline and formaldehyde.

Illustrative of the polyester polyols which can be employed in the process of the invention are those prepared from dibasic carboxylic acids and polyhydric alcohols, preferably trihydric alcohols. The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids may be used also. The polyol component or components of the polyester are preferably trihydric. Examples of suitable polyols include trimethylolethane, trimethylolpropane, mannitol, hexanetriol, glycerine and pentaerythritol. Small amounts of dihydric alcohols such as ethylene glycol, diethylene glycol, 1,2-propylene glycol, 1,4-butanediol, and cyclohexanediol may also be used. In preparing rigid polyurethane foams it is recommended that no more than about 20% of the hydroxyl groups of the polyester used be supplied by a diol. The above polyesters are typical of those which can be employed in the one-shot, but preferably in the prepolymer, methods of foaming using the process of the invention.

The polyol component employed in making polyurethanes in accordance with this invention, can, if desired, also include a phosphorus containing polyol of the type known in the art to impart fire retardancy to polyurethanes. In this way it is possible to enhance still further the degree of fire retardancy imparted to the resulting polyurethanes by the compounds of Formula I. In general the compounds of Formula I are less expensive to produce than the phosphorus containing polyols currently employed to impart fire retardancy to polyurethanes. Accordingly the compounds (I) can be used to replace in part or completely the phosphorus containing polyols and thereby impart the desired fire retardancy to polyurethanes at a lower cost than was hitherto possible. In addition the compounds (I) have the advantage that their use in the preapration of polyurethane foams does not adversely affect the dimensional stability of the latter in contrast to the behavior of phosphorus containing polyols currently employed commercially.

Examples of phosphorus containing polyols which can be employed in combination with the polyols of Formula I are dialkyl N,N-di(hydroxyalkyl)aminomethane phosphonates such as diethyl N,N-di(2-hydroxyethyl)aminomethane phosphonate, propylene oxide adducts of phosphoric acid such as those described in U.S. Patents 2,372,244 and 3,094,549, and tris propylene glycol phosphates such as those described in U.S. Patent 3,061,625.

The amount of phosphorus containing polyol which is employed in combination with the polyol of Formula I can vary over a wide range. Advantageously the amount of phosphorus containing polyol used is so chosen that the phosphorus content of the resulting poulyurethane lies in the range of about 0.25 to about 1.50 percent by weight.

In making rigid foams in accordance with the process of the invention it is advantageous to add a hydroxyl terminated crosslinking polyol to the reaction mixture to form the best network for foam formation. Advantageously the crosslinking polyol should have at least 3 hydroxy groups in the molecule and can be added to the foam reaction mix at any point at which the other polyols are added. Examples of such crosslinking polyols are trimethylolpropane, glycerol, 1,2,6-hexanetrial, pentaerythritol, hydroxyalkylated aliphatic diamines such as N,N,N',N'-tetrakis(2 - hydroxypropyl)ethylenediamine, N,N,N',N'-tetrakis(2-hydroxyethyl)ethylenediamine, and the like, and alkylene oxide reaction products of sugars such as sucrose, and the like.

In preparing polyurethane foams according to the invention, it is desirable, in accordance with conventional procedures, to employ a catalyst in the reaction of the polyisocyanate and polyol. Any of the catalysts conventionally employed in the art to catalyze the reaction of an isocyanate with a reactive hydrogen containing compound can be employed for this purpose; see, for example, Saunders et al., ibid, volume I, pp. 228–232; see also Britain et al. "J. Applied Polymer Science," 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. The preferred catalysts for use in the process and compositions of the invention are the tertiary organic amines of which the following are representative: triethylamine, triethylenediamine, N,N,N',N'-tetramethylethylenediamine, N,N,N', N'-tetraethylethylene diamine, N-methylmorpholine, N-ethyl-morpholine, N,N,N',N'-tetramethylguanidine, N,N,N',N'-tetramethyl-1,3-butanediamine, N,N - dimethylethanolamine, N,N-diethylethanolamine, and the like, or mixtures of two or more such amines. The amount of catalyst employed is generally within the range of about 0.1 to about 2.0% by weight based on total weight of reactants in the polyurethane forming reaction mixture.

The ratio of isocyanate groups to active hydrogen containing groups in the foam mixtures of the invention is within the normal limits employed in the production of polyurethane foams. Thus said ratio is advantageously within the range of from 1.50 to 0.65:1 and preferably within the range of 1.20:1 to 1:1, whether the isocyanate and polyol (i.e. mixture of conventional polyol and polyol of Formula I) are employed separately in the one-shot process or whether the two components have been reacted to form a prepolymer. The lower ratio of ranges of isocyanate to active hydrogen group ratio are used where the polyol is highly functional.

The final foam density of the products produced by the process of the invention can be controlled in accordance with methods well known in the art. For example, this control can be accomplished by regulating the amount of water present in the foam mixture or by using a combination of water and a conventional blowing agent having a boiling point below about 110° C. and preferably below about 50° C. such as a volatile aliphatic hydrocarbon or a volatile highly halogenated hydrocarbon, for example, trichloromonofluoromethane, dichlorodifluoromethane, chlorotrifluoromethane, 1,1-dichloro-1-fluoroethane, 1-chloro-1, 1-difluoro-2, 2-dichloroethane and 1,1,1-trifluoro-2-chloro-2-fluorobutane or mixtures thereof.

Optional additives such as dispersing agents, cell stabilizers, surfactants, flame retardants, and the like which are commonly employed in the fabrication of rigid polyurethane foams, can be employed in the process of the invention. Thus a finer cell structure may be obtained if water-soluble organosilicone polymers are used as surfactants. Organosilicone polymers obtained by condensing a polyalkoxy polysilane with the monoether of a polyalkyleneether glycol in the presence of an acid catalyst are representative of those surfactants which may be used for this purpose. The organosilicone copolymer available under the trade name L-5320 is typical of such polymers. Other surfactants such as ethylene oxide modified sorbitan monopalmitate or ethylene oxide modified polypropyleneether glycol may be used, if desired, to obtain better dispersion of the components of the foam mixture.

Other additives such as dyes, pigments, soaps and metallic powders and other inert fillers may be added to the foam mixture to obtain special foam properties in accordance with practices well-known in the art.

The fire-retardant polyurethanes produced in accordance with the present invention are useful for the purposes for which polyurethanes are conventionally employed. For example, the rigid and semi-rigid polyurethane foams produced according to the invention are useful for insulating purposes, either as slab stock or in preformed building panels and, because of their ability to hold lubricants and to resist torque, as transmission plates in power transmission systems using fluids, and in similar systems. The flexible foams produced according to the invention are useful for a variety of cushioning, upholstery and like uses. The elastomeric polyurethanes produced in accordance with the invention find application in the preparation of gaskets, flexible tubing and the like.

The compounds of Formula I which are employed in preparing polyurethanes in accordance with the process of the invention are, for the most part, known in the art and can be prepared by conventional procedures. Advantageously, the compounds of Formula I are prepared by reaction of the appropriate isocyanate $Ar(NCO)_n$ wherein Ar and $n$ are as hereinbefore defined with the appropriate amine $HNR_1R_2$ wherein $R_1$ and $R_2$ are as hereinbefore defined, using procedures such as that described in U.S. Patent 2,663,729.

The following preparations and examples describe the manner and process of making and using the invention and set forth the best mode contemplated by the inventors of carrying out the invention but are not to be construed as limiting

PREPARATION 1 di-p-[3,3-bis(2-hydroxyethyl)]ureidophenylmethane

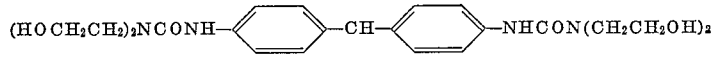

A solution of 125 g. (0.5 mole) of 4,4'-methylenebis-(phenyl isocyanate) in 500 ml. of benzene was added slowly with stirring to a solution of 105 g. (1 mole) of diethanolamine in 500 ml. of benzene. When the addition was complete the mixture was heated under reflux for 2 hrs. before being cooled to about 20° C. The solid which had separated was isolated by filtration, and dried in air. There was thus obtained 206 g. (95.9% theoretical) of di-p-[3,3-bis(2-hydroxyethyl)]ureiodophenylmethane in the form of a crystalline solid having a melting point of 135 to 138° C.

The above material is useful as a polyol in the preparation of polyurethane foams in accordance with procedures described in Examples 1 to 4 hereinafter.

PREPARATION 2 di-p-[3,3-bis(2-hydroxypropyl)]ureidophenylmethane

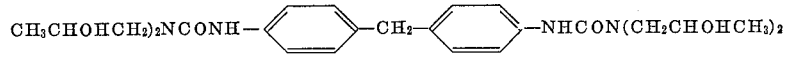

A soltuion of 125 g. (0.5 mole) of 4,4'-methylenebis-(phenyl isocyanate) in 500 ml. of benzene was added slowly with vigorous stirring to a solution of 133.2 g. (1 mole) of diisopropanolamine in 500 ml. of benzene. After the addition was complete the mixture was heated under reflux, with stirring, for 6 hours. The reaction product so obtained was cooled to about 20° C. and the solid which had separated was isolated by filtration, washed with benzene and dried in air. There was thus obtained 248.4 g. (96.2% theoretical yield) of di-p-[3,3-bis(2-hydroxypropyl)]-ureiodophenylmethane in the form of a solid.

The above material is useful as a polyol in the preparation of polyurethane foams in accordance with procedures described in Examples 1 to 4 hereinafter.

*Example 1*

A series of three rigid polyurethane foams was prepared; in two of the foam mixes 1-p-bromophenyl-3,3-di(2-hydroxyethyl)urea [prepared from p-bromophenyl isocyanate and diethanolamine using the procedure of U.S. 2,663,729] was employed as one ingredient of the polyol component. The materials employed in preparing the foams are shown in Table I below, all amounts being expressed as parts by weight. In preparing foams, the polyol, FR–P8, 1-p-bromophenyl-3,3-di(2-hydroxyethyl)-urea (when used), DC–201, N,N,N',N'-tetramethyl-1,3-butanediamine, and triethylamine were mixed mechanically and the Isotron 11–B was added with stirring until the mixture had registered the required increase in weight. The resulting mixture and the PAPI® were then blended mechanically and poured as rapidly as possible into a 7" x 7" x 12" mold. The foam was allowed to rise freely and was allowed to cure for 1 week at about 20° C. before determination of the physical properties shown in Table I. The tests were all carried out in accordance with ASTM–D–1692.

TABLE I

|  | 1A | 1B | 1C |
|---|---|---|---|
| Polyol [1] of eq. wt.=133 | 67 | 50 | 63 |
| FR–P8 [2] | 33 | 23 | 10 |
| 1-p-bromophenyl-3,3-di (2-hydroxyethyl) urea |  | 27 | 27 |
| DC–201 [3] | 2 | 2 | 2 |
| N,N,N',N'-tetramethyl-1,3-butanediamine | 1 | 0.5 | 0.5 |
| Triethylamine | 1 | 0.5 | 0.5 |
| Isotron 11–B [4] | 34 | 34 | 34 |
| PAPI ® [5] | 105 | 104 | 105 |
| Percent Phosphorus | 1.02 | 0.715 | 0.381 |
| Percent Bromine |  | 3.09 | 3.08 |
| NCO/OH Ratio | 1.10 | 1.10 | 1.10 |
| Density, pcf | 1.83 | 1.79 | 1.82 |
| Compression (// to rise), p.s.i | 38.3 | 37.9 | 27.4 |
| Strength/Density | 20.9 | 21.2 | 15.1 |
| Percent Δ Volume at 158° F., 100% Relative Humidity | | | |
| 24 hours | 9.6 | 6.7 | 6.6 |
| 14 days | 19.7 | 13.8 | 11.8 |
| Percent Δ Volume at 200° F., Dry Heat | | | |
| 3 days | 5.5 | 4.2 | 3.9 |
| 7 days | 7.0 | 5.6 | 4.6 |
| Post Dry Aging: | | | |
| Density, pcf | 1.81 | 1.80 | 1.78 |
| Compression (// to rise), p.s.i | 43.2 | 47.8 | 48.7 |
| Strength/Density | 23.7 | 26.6 | 27.3 |
| Flammability Tests | | | |
| ASTM D–1692–59T: | | | |
| Total Inches Burned | 1½ | 1 1/16 | 1 3/16 |
| Classification | SE | SE | SE |

[1] A blend of (i) an adduct of propylene oxide and a methylene bridged polyphenyl polyamine mixture obtained by acid condensation of aniline and formaldehyde and (ii) a glycerolpropylene oxide adduct.
[2] A propyleneoxide polyol adduct of phosphoric acid (EW=150).
[3] Liquid silicone-glycol copolymer cell control agent and foam stabilizer.
[4] Stabilized trichlorofluoromethane.
[5] Polymethylene polyphenyl isocyanate, IE 133.

The above data shows that up to 70% by weight of the phosphorus polyol FR–P8 was replaced by an equivalent amount (based on hydroxy equivalents) of 1-p-bromophenyl-3,3-di(2-hydroxyethyl)urea without affecting the fire retardant properties and vastly improving the dimensional stability properties of the resultant foams.

Example 2

This example shows the preparation of four rigid polyurethane foams in three of which a part of the phosphorus containing polyol was replaced by increasing proportions of 1-p-bromophenyl-3,3-di(2-hydroxypropyl)urea [prepared from p-bromophenyl isocyanate and diisopropanolamine using the procedure of U.S. 2,663,729]. The foams were prepared in the same manner as that described in Example 1. The proportions of ingredients and physical properties of the resulting foams (after curing for 1 week at about 20° C.) are shown in Table II.

TABLE II

|  | 2A | 2B | 2C | 2D |
|---|---|---|---|---|
| Polyol of eq. with.=133 (footnote 1 of Table I) | 67 | 46 | 54 | 62 |
| FR–P8 | 33 | 24 | 16 | 8 |
| 1-p-bromophenyl-3,3-di(2-hydroxypropyl) urea |  | 30 | 30 | 30 |
| DC–201 | 2 | 2 | 2 | 2 |
| N,N,N',N'-tetramethyl-1,3-butanediamine | 1 | 1 | 1 | 1 |
| Triethylamine | 1 | 1 | 1 | 1 |
| Isotron 11–B | 34 | 33 | 33 | 34 |
| PAPI® | 105 | 100 | 102 | 105 |
| Percent Phosphorus | 1.02 | 0.76 | 0.50 | 0.25 |
| Percent Bromine |  | 3.10 | 3.07 | 3.04 |
| NCO Ratio | 1.10 | 1.10 | 1.10 | 1.10 |
| Density, pcf | 1.83 | 1.85 | 1.80 | 1.84 |
| Compression (// to rise), p.s.i | 38.3 | 34.5 | 35.0 | 35.8 |
| Strength/Density | 20.9 | 18.6 | 19.4 | 19.4 |
| Percent Δ Volume at 158° F. 100% Relative Humidity | | | | |
| 24 hours | 9.6 | 9.7 | 7.9 | 6.5 |
| 14 days | 19.7 | 18.1 | 13.5 | 11.1 |
| Percent Δ Volume at 200° F. Dry Heat | | | | |
| 3 days | 5.5 | 6.1 | 5.4 | 4.8 |
| 7 days | 7.0 | 7.4 | 6.7 | 5.8 |
| Post Dry Aging: | | | | |
| Density, p.c.f. | 1.81 | 1.80 | 1.76 | 1.83 |
| Compression (// to rise), p.s.i | 43.2 | 44.1 | 40.1 | 42.4 |
| Strength/Density | 23.7 | 24.5 | 22.8 | 23.2 |
| Flammability Tests | | | | |
| ASTM D1692-59T: | | | | |
| Total Inches Burned | 1½ | 1 1/16 | 1¼ | 1¾ |
| Classification | SE | SE | SE | SE |

The above data shows that up to 75% by weight of the phosphorus polyol FR–P8 was replaced by 1-p-bromophenyl-3,3-di(2-hydroxypropyl)urea without affecting the fire retardant properties or any other physical properties of the resulting foams.

Similarly, using the procedure described in Example 1, but replacing 1-p-bromophenyl-3,3-di(2-hydroxyethyl)urea by di-p-[3,3-bis(2-hydroxyethyl)]ureoidophenylmethane, di-p-[3,3-bis(2-hydroxypropyl)]ureidophenylmethane, 1-(2,4,6-trichlorophenyl)-3,3-di(2-hydroxyethyl)urea, 1-(o-bromophenyl)-3,3-bis(2-hydroxyethyl)urea, 1-(2,4-dichlorophenyl)-3,3-bis(2-hydroxyethyl)urea, 1-(2,4,6-tribromophenyl)-3,3-bis(2-hydroxyethyl)urea, 1,1'-(5-bromo-1-methylphenylene-2,4)-bis-[3,3-di(2-hydroxyethyl)urea, 1,1'-(2,6-dibromo-4-methylphenylene-1,3)bis[3,3-di(2-hydroxyethyl)urea], 1,1'-(4,4'-phenylene)bis[3,3-di(2-hydroxyethyl)urea] and the like (all of which are prepared by reaction of the appropriate isocyanate and alkanolamine in accordance with the procedure of U.S. Patent 2,663,729), there are obtained polyurethane rigid foams having fire retardant properties.

Example 3

Using the procedure described in Example 1 a rigid polyurethane foam was prepared from the components shown in Table III below. The foam was cured for 1 week at about 20° C. after which it was found to have the physical properties recorded in Table III.

TABLE III

| | |
|---|---|
| Polyol of eq. wt.=133 (Footnote 1 of Table I) | 72 |
| p-Bromophenyl-3,3-di(2-hydroxyethyl)urea | 28 |
| L–5320 [1] | 2 |
| N,N,N',N'-tetramethyl-1,3-butanediamine | 0.5 |
| Triethylamine | 0.5 |
| Freon 11–B trichlorofluoromethane | 32 |
| PAPI® | 118 |
| Density, p.c.f. | 1.91 |
| Compression (// to rise) p.s.i. | 27.6 |
| Strength/Density | 14.5 |

Percent change in volume at 158° F., 100% R.H., after:

| | |
|---|---|
| 24 hours | 2.6 |
| 3 days | 2.8 |
| 7 days | 3.7 |

Percent change in volume at 200° F., Dry Heat, after:

| | |
|---|---|
| 3 days | 1.0 |
| 7 days | 1.7 |

Flammability Tests (ASTM–D1692–59T):

Total inches burned _____ 1.0625
Classification _____ Self-extinguishing

¹ Low viscosity liquid silicone surfactant (Union Carbide).

Example 4

Using the procedure decsribed in Example 1, a series of rigid polyurethane foams were prepared using the components (amounts in parts by weight) shown in Table IV below. In all cases the polyol component was a mixture of Fyrol 6 (O,O-diethyl N,N-bis(2-hydroxyethyl)aminomethane phosphonate: alone or in admixture with either 1-phenyl-3,3-di(2-hydroxyethyl)urea or 1-p-bromophenyl-3,3-di(2-hydroxyethyl)urea. Each foam was cured for 1 week at 20° C. when the physical properties were as shown in Table IV.

TABLE IV

| Foam | 4A | 4B | 4C | 4D | 4E | 4F | 4G | 4H | 4I |
|---|---|---|---|---|---|---|---|---|---|
| Polyol of eq. wt.=133 (footnote 1 of Table I) | 95 | 67 | 66 | 90 | 62 | 61 | 85 | 57 | 56 |
| 1-p-bromophenyl-3-3,bis(2-hydroxyethyl)urea | | 28 | | | 28 | | | 28 | |
| 1-phenyl-3,3-bis(2-hydroxyethyl)urea | | | 28 | | | 28 | | | 28 |
| Fyrol 6 | 5 | 5 | 6 | 10 | 10 | 11 | 15 | 15 | 16 |
| L-5320 | 2 | 2 | 2 | 2 | 2 | 2 | 2 | 2 | 2 |
| N,N,N',N'-tetramethyl-1,3-butanediamine | 1 | 0.3 | 0.5 | 1 | 0.3 | 0.5 | 1 | 0.5 | 0.5 |
| Triethylamine | 1 | 0.3 | 0.5 | 1 | 0.3 | 0.5 | 1 | 0.5 | 0.5 |
| Freon 11-B | 33 | 32 | 34 | 33 | 32 | 34 | 33 | 32 | 34 |
| PAPI® | 116 | 112 | 122 | 117 | 112 | 122 | 117 | 113 | 123 |
| Density, pcf. | 1.94 | 1.98 | 1.80 | 1.99 | 1.84 | 1.82 | 1.86 | 1.84 | 1.80 |
| Compression (// to rise) p.s.i. | 27.7 | 36.1 | 34.5 | 34.4 | 30.8 | 24.5 | 38.5 | 24.1 | 31.2 |
| Strength/Density | 14.3 | 18.2 | 19.2 | 17.3 | 16.6 | 18.2 | 20.7 | 13.1 | 17.3 |
| Percent change in volume at 158° F., 100% R.H., after: | | | | | | | | | |
| 24 hrs | 2.4 | 3.4 | 2.9 | 4.0 | 3.4 | 4.0 | 6.0 | 3.7 | 5.7 |
| 3 days | 2.4 | 3.9 | 3.0 | 4.0 | 3.7 | 04.1 | 6.6 | 4.0 | 6.4 |
| 7 days | 3.9 | 5.1 | 3.9 | 5.7 | 4.3 | 5.1 | 9.2 | 5.4 | 7.9 |
| Percent change in volume at 200° F., Dry Heat, after: | | | | | | | | | |
| 3 days | 1.1 | −0.06 | 0.06 | 0.68 | 0.88 | 0.66 | 1.0 | 0.48 | 0.36 |
| 7 days | 2.2 | 0.54 | 1.40 | 1.50 | 1.60 | 1.50 | 2.4 | 1.40 | 1.30 |
| Flammability Tests (ASTM D1692-59T): | | | | | | | | | |
| Total inches burned | 2.0 | 0.938 | 1.375 | 1.5 | 0.875 | 1.0 | 1.375 | 0.875 | 1.18 |
| Classification | SE | NB | SE | SE | NB | SE | SE | NB | SE |

We claim:
1. A fire retardant polyurethane foam which comprises the product of reaction, under foam producing conditions, of:
   (a) an organic polyisocyanate; and
   (b) a polyol which comprises a mixture of
      (i) a polyol having an hydroxyl number with the range of 180 to 800,
      (ii) a phosphorus-containing polyol selected from the class consisting of a dialkyl N,N-di(hydroxyalkyl) amino methane phosphonate, a propylene oxide adduct of phosphoric acid, and a tris propylene glycol phosphate, and
      (iii) a compound having the formula

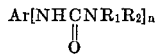

wherein Ar represents an aromatic hydrocarbon residue having a valency $n$ which is substituted by from 0 to 4 halogen atoms, $R_1$ and $R_2$ each represent lower hydroxyalkyl and $n$ is an integer from 1 to 3, inclusive;

wherein the amount of phosphorus-containing polyol present in the reaction mixture is sufficient to impart to the said polyurethane foam a phosphorus content within the range of about 0.25 to about 1.50 percent by weight.

2. A fire retardant polyurethane foam according to claim 1 wherein the component (iii) is 1-p-bromophenyl-3,3-di(2-hydroxyethyl) urea.

3. A fire retardant polyurethane foam according to claim 1 wherein the component (iii) is 1-phenyl-3,3-di-(2-hydroxyethyl)urea.

4. A fire retardant polyurethane foam according to claim 1 wherein the phosphorus-containing polyol is O,O-diethyl N,N-bis(2-hydroxyethyl) aminomethane phosphonate.

5. A fire retardant polyurethane foam according to claim 1 wherein the phosphorus-containing polyol is a phosphoric acid-propylene oxide adduct.

References Cited

UNITED STATES PATENTS 2,663,729  12/1953  Searle et al. _____ 260—553
3,321,415   5/1967  Hennig et al. _____ 260—2.5

DONALD E. CZAJA, *Primary Examiner.*

MICHAEL B. FEIN, *Assistant Examiner.*

U.S. Cl. X.R.

260—75, 77.5, 553